(12) United States Patent
Diep et al.

(10) Patent No.: US 12,058,394 B2
(45) Date of Patent: Aug. 6, 2024

(54) DYNAMIC VISUAL WATERMARK FOR STREAMING VIDEO

(71) Applicant: WHDIYO LLC, Costa Mesa, CA (US)

(72) Inventors: Adam Diep, Irvine, CA (US); Jun Yin, Chengdu (CN)

(73) Assignee: WHDIYO LLC, Costa Mesa, CA (US)

(*) Notice: Subject to any disclaimer, the term of this patent is extended or adjusted under 35 U.S.C. 154(b) by 0 days.

(21) Appl. No.: 18/185,176

(22) Filed: Mar. 16, 2023

(65) Prior Publication Data

US 2023/0345064 A1 Oct. 26, 2023

Related U.S. Application Data

(60) Provisional application No. 63/333,648, filed on Apr. 22, 2022.

(51) Int. Cl.
*H04N 21/2389* (2011.01)
*H04N 21/2347* (2011.01)
*H04N 21/237* (2011.01)
*H04N 21/254* (2011.01)
*H04N 21/8358* (2011.01)
*H04N 21/2187* (2011.01)

(52) U.S. Cl.
CPC ... *H04N 21/23892* (2013.01); *H04N 21/2347* (2013.01); *H04N 21/237* (2013.01); *H04N 21/2541* (2013.01); *H04N 21/8358* (2013.01); *H04N 21/2187* (2013.01)

(58) Field of Classification Search
CPC ......... H04N 21/23892; H04N 21/2347; H04N 21/237; H04N 21/2541; H04N 21/8358; H04N 21/2187
See application file for complete search history.

(56) References Cited

U.S. PATENT DOCUMENTS 5,635,978 A * 6/1997 Alten .............. H04N 7/025
725/43
6,889,325 B1 * 5/2005 Sipman .............. H04L 63/126
380/37

(Continued)

OTHER PUBLICATIONS

International Search Report & Written Opinion dated Jul. 31, 2023 from PCT Application No. PCT/US23/64563.

*Primary Examiner* — Michael B. Pierorazio
(74) *Attorney, Agent, or Firm* — INNOVATION CAPITAL LAW GROUP, LLP; Vic Lin

(57) ABSTRACT

Systems and methods provide features in streaming media and video distribution by taking streaming video, including video-on-demand and live streams, and applying a dynamic visual watermark as desired by the content owner or broadcaster. The dynamic visual watermark can be a visible watermark that can be generated for each stream, viewer, or user. The techniques can retain the quality of the stream, make anti-piracy implementation feasible (typically about 1% of the cost of conventional techniques), work on live streams, work with any choice of vendor for cloud platforms, DRM providers, or other watermarking vendors, and does not require huge setup and integration to make it work. The video streaming solutions provides a tool to the broadcasters to mark every stream if desired. The video streaming solutions can be burnt in at the server-side and can be platform agnostic to the cloud platforms, software, and networks.

17 Claims, 9 Drawing Sheets

(56) References Cited

U.S. PATENT DOCUMENTS

| | | | |
|---|---|---|---|
| 7,653,921 B2* | 1/2010 | Herley | H04N 21/4332 382/199 |
| 7,991,770 B2* | 8/2011 | Covell | H04N 21/812 707/758 |
| 8,190,435 B2* | 5/2012 | Li-Chun Wang | G06F 16/683 704/270 |
| 8,462,982 B2* | 6/2013 | Colaitis | H04N 19/467 382/100 |
| 8,510,770 B1* | 8/2013 | Oztaskent | H04H 60/56 709/201 |
| 9,119,708 B2* | 9/2015 | Wanderer | A61F 5/08 |
| 10,560,728 B2* | 2/2020 | Cain | H04N 21/4345 |
| 2002/0072982 A1* | 6/2002 | Barton | G06Q 30/0625 705/14.1 |
| 2004/0055009 A1* | 3/2004 | Hayashida | H04N 21/47 725/39 |
| 2004/0143349 A1* | 7/2004 | Roberts | G06F 16/634 704/278 |
| 2004/0163110 A1* | 8/2004 | Won | H04N 21/435 725/50 |
| 2005/0028195 A1* | 2/2005 | Feinleib | H04N 7/163 725/135 |
| 2005/0144455 A1* | 6/2005 | Haitsma | G06F 16/683 713/176 |
| 2005/0192863 A1* | 9/2005 | Mohan | G06Q 30/02 705/14.27 |
| 2006/0224452 A1* | 10/2006 | Ng | G06Q 30/0242 705/14.27 |
| 2006/0256133 A1* | 11/2006 | Rosenberg | G06F 3/013 345/619 |
| 2007/0124756 A1* | 5/2007 | Covell | G06F 16/635 348/E7.071 |
| 2007/0179850 A1* | 8/2007 | Ganjon | G06Q 30/00 705/14.27 |
| 2007/0212019 A1* | 9/2007 | Kimura | H04N 21/84 386/291 |
| 2008/0049704 A1* | 2/2008 | Witteman | H04H 60/58 370/342 |
| 2008/0082510 A1* | 4/2008 | Wang | G06F 16/683 |
| 2009/0313670 A1* | 12/2009 | Takao | H04N 21/47 725/110 |
| 2010/0114713 A1* | 5/2010 | Anderson | G06Q 20/10 705/14.69 |
| 2011/0071838 A1* | 3/2011 | Li-Chun Wang | G10L 25/54 704/E11.001 |
| 2011/0129114 A1* | 6/2011 | Colaitis | H04N 19/70 382/100 |
| 2011/0273455 A1* | 11/2011 | Powar | G11B 27/10 345/473 |
| 2011/0283319 A1* | 11/2011 | Davis | H04N 21/2665 725/39 |
| 2012/0295560 A1* | 11/2012 | Mufti | H04B 13/00 455/95 |
| 2012/0297400 A1* | 11/2012 | Hill | G06F 9/445 719/318 |
| 2012/0316969 A1* | 12/2012 | Metcalf, III | G06Q 30/0269 705/14.66 |
| 2013/0029762 A1* | 1/2013 | Klappert | A63F 13/792 463/31 |
| 2013/0031579 A1* | 1/2013 | Klappert | H04N 21/812 725/32 |
| 2013/0042262 A1* | 2/2013 | Riethmueller | H04N 21/25866 725/14 |
| 2013/0044051 A1* | 2/2013 | Jeong | H04N 21/485 345/156 |
| 2013/0067512 A1* | 3/2013 | Dion | H04N 21/44224 725/32 |
| 2013/0073366 A1* | 3/2013 | Heath | G06Q 30/0261 705/14.25 |
| 2013/0073377 A1* | 3/2013 | Heath | G06Q 30/02 705/14.39 |
| 2013/0080242 A1* | 3/2013 | Alhadeff | G06F 16/957 705/14.39 |
| 2013/0080262 A1* | 3/2013 | Scott | G06Q 30/02 705/14.68 |
| 2013/0085828 A1* | 4/2013 | Schuster | G06Q 30/0207 705/14.39 |
| 2013/0111519 A1* | 5/2013 | Rice | G06Q 30/02 725/34 |
| 2013/0124073 A1* | 5/2013 | Ren | G08G 1/00 701/118 |
| 2014/0196070 A1* | 7/2014 | Moskowitz | H04N 21/6582 725/19 |
| 2014/0351871 A1 | 11/2014 | Bomfim et al. | |
| 2015/0082349 A1* | 3/2015 | Ishtiaq | H04N 21/4316 725/40 |
| 2015/0143416 A1* | 5/2015 | Onno | H04N 21/8358 725/34 |
| 2015/0222950 A1* | 8/2015 | Sant | H04N 21/84 725/18 |
| 2015/0229979 A1* | 8/2015 | Wood | H04N 21/4663 725/14 |
| 2017/0163839 A1 | 6/2017 | Arana et al. | |
| 2017/0180822 A1* | 6/2017 | Pradel | H04N 21/438 |
| 2018/0184160 A1* | 6/2018 | Cain | H04N 21/44016 |
| 2018/0343481 A1* | 11/2018 | Loheide | H04L 67/01 |
| 2018/0367637 A1* | 12/2018 | Balazinski | H04N 21/64322 |
| 2019/0124377 A1* | 4/2019 | Chen | H04N 21/85406 |
| 2019/0246152 A1* | 8/2019 | Zuydervelt | H04N 21/238 |
| 2019/0313161 A1* | 10/2019 | Wilms | H04N 21/8456 |
| 2019/0356966 A1* | 11/2019 | Zuydervelt | H04N 21/4825 |
| 2022/0021722 A1* | 1/2022 | Panje | H04N 21/4627 |

* cited by examiner

DYNAMIC VISUAL WATERMARK FOR STREAMING VIDEO

BACKGROUND OF THE INVENTION

1. Field of the Invention

Embodiments of the invention relate generally to systems and methods for applying a dynamic visual watermark to a streaming video. Such a dynamic visual watermark may be useful, for example, in anti-piracy applications as well as for branding, marketing, advertising, and the like.

Additionally, embodiments of the present invention are capable of applying dynamic, also known as session-based, processing such as forensic watermarks, meta data, and other transcoding processing of streaming media (audio and video) for both pre-recorded and live-stream applications.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Pirated content is content that is broadcast or sold without the permission of the content producer, content distributor, or licensed broadcaster. According to research, the global streaming or video content market will grow from $93 billion in 2018 to more than $135 billion in 2022. According to the data, about 39% of this amount is pirated content.

Almost all long-form video content, premium content, and live streams from large and small streaming services, are targets for piracy as well as pre-released content being "leaked" to the public prematurely. This has a tremendous impact on the profitability of content owners and broadcasters.

While there are forensic watermarking technologies that can trace the original leaker or pirate, visible watermarks are often used to deter the piracy in the first place. A generic visible watermark, however, does little to deter piracy. Conventional solutions to apply a visible watermark onto the videos directly ("burn-in") are cumbersome and cost prohibitive, often costing up to $1 per minute of content to watermark. Furthermore, conventional implementations are cumbersome and not flexible with additional antipiracy protections (such as a choice of forensic watermarking partners, digital rights management (DRM), lack of compatibility to integrate with existing workflows and video platforms). Existing solutions can also degrade the video streaming quality and require additional complexed components in order to make it work. Also, there are no current solutions that burn-in visible watermarks dynamically for live streams that scale.

Further, typical conventional solutions that performs some level of "dynamic" or "session-based" or "user" visible watermarks do so on the "client" level. In other words, either on the player or app. These can be potentially hacked and filtered as they are overlays to the video stream. Overlays can be either defeated, or if the video stream is intercepted, will not show overlays.

In view of the foregoing, there is a need for antipiracy methods that can be used, in a computing resource efficient manner, for streaming video content, including live streams.

SUMMARY OF THE INVENTION

Embodiments of the present invention provide systems and methods for applying a dynamic visual watermark to a streaming video, such as a live stream, video-on-demand, or the like.

According to embodiments of the present invention, there is provided a system for providing a dynamic watermark to streaming media comprising a streaming proxy server and visual watermark encoding service receiving a streaming media bitstream from a stream packager and also receiving watermark details from a content provider, wherein the streaming proxy server and visual watermark encoding service provides a unique bitstream with the dynamic watermark to a user; and the dynamic watermark is applied to a bitstream server-side of the streaming media bitstream, prior to being delivered to equipment of the user.

According to further embodiments of the present invention, there is provided a method for providing dynamic processing to streaming data comprising receiving the streaming data from a content provider; receiving dynamic processing data from the content provider; preparing a bitstream of the streaming data with the dynamic processing applied thereto; and delivering the streaming data with the dynamic processing applied thereto to a user.

According to further embodiments of the present invention, there is provided a method for providing a dynamic watermark to a video bitstream comprising parsing a manifest of the video bitstream; downloading video segments to a streaming proxy server and visible watermark encoding service; adding the dynamic watermark to the video segments; reformatting the dynamic watermark applied video segments; building a new manifest for playback of a unique bitstream with the dynamic watermark applied; and delivering the unique bitstream to video viewing equipment of a user.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
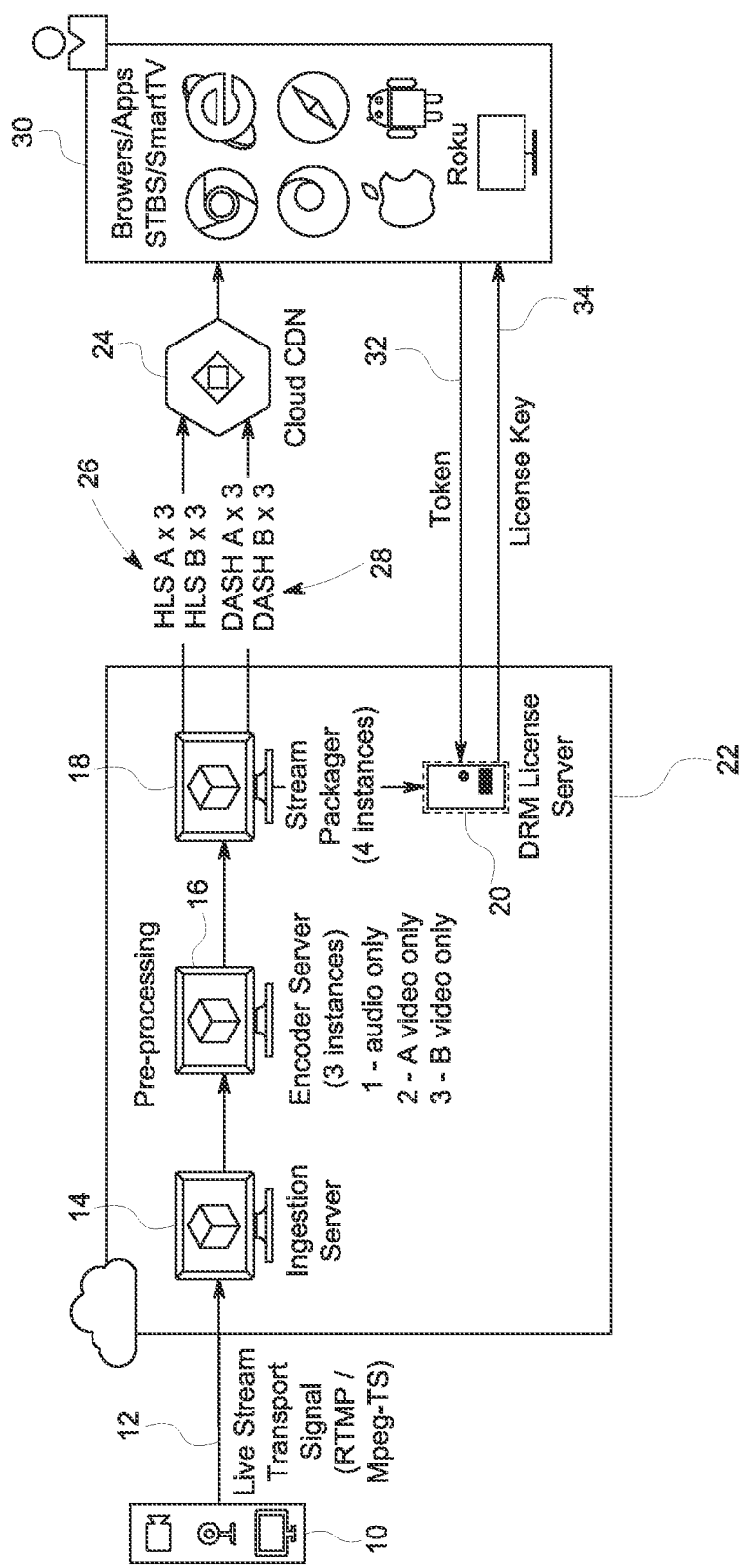
FIG. 1 illustrates a flow chart showing a typical screener level protected workflow according to the prior art, used on a live stream with DRM and forensics A/B dynamic manifests.

Unless otherwise indicated illustrations in the figures are not necessarily drawn to scale. The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

A "computer" or "computing device" may refer to one or more apparatus and/or one or more systems that are capable of accepting a structured input, processing the structured input according to prescribed rules, and producing results of the processing as output. Examples of a computer or computing device may include: a computer; a stationary and/or portable computer; a computer having a single processor, multiple processors, or multi-core processors, which may operate in parallel and/or not in parallel; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units. A "computer" can include dedicated hardware implementations including, but not limited to, application specific integrated circuits, programmable logic arrays and other hardware devices can likewise be constructed to implement the methods described herein. Furthermore, a "computer" can include alternative software implementations including, but not limited to, distributed processing or component/object distributed processing, parallel processing, or virtual machine processing, which can also be constructed to implement the methods described herein.

"Software" or "application" may refer to prescribed rules to operate a computer. Examples of software or applications may include code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, Objective C, Smalltalk, Python, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object-oriented programming language such as Java, Smalltalk, C++, C# or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be distributed among a plurality of computational units wherein each unit processes a portion of the total computation.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth®, TDMA, CDMA, 3G, 4G, 5G, or the like.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device.

Broadly, embodiments of the present invention provide systems and methods for providing a dynamic visual watermark feature in streaming media and video distribution. The systems and methods can take streaming video, including video-on-demand and live streams, and apply a dynamic visual watermark as desired by the content owner or broadcaster. The dynamic visual watermark is a visible watermark that can be uniquely generated for each stream, viewer, or user. The techniques can retain the quality of the stream, make implementation of the dynamic visual watermark feasible (typically about 1% of the cost of conventional "burn-in" techniques when used for anti-piracy, for example), work on live streams, work with any choice of vendor for cloud platforms, DRM providers, or other forensic watermarking vendors, and does not require huge setup and integration to make it work (if no DRM nor A/B forensics are involved). Implementation can take as little time as it takes to fill out an online form.

The video publishing/streaming solutions according to aspects of the present invention can provide a media stream manipulation system to the broadcasters, if they choose, to mark every stream with a dynamic visual watermark. This goes after the root of the problem (the people who are creating the pirate streams for everyone else). Unlike conventional solutions that provide a client-side solution at the user's application or display device, which can be hacked and filtered as they are overlays to the video stream, the video publishing/streaming solutions according to aspects of the present invention are "burnt in" at the "server-side", or more precisely, "bit-stream server-side at the edge", as described in greater detail below. The video publishing/streaming solutions according to aspects of the present invention can be platform agnostic to the cloud platforms, software, and networks.

In some embodiments, the dynamic visual watermark can be, for example, text, images, QR codes (or similar), and pixel manipulation, such as shading, outlining, or the like. In some embodiments, aspects of the present invention can provide a system that uses a code on the video streams, that, if something took a screen capture, the system can still use some of the manipulated pixels in narrowing down who could be the "leaker" of the content. Accordingly, aspects of the present invention can provide not only anti-piracy, but leak prevention to, for example, preserve surprise plot points and spoilers of an unreleased movie or episode or show.

In some embodiments, the invention can utilize commercial-off-the-shelf (COTS) and open-source cloud platforms, video encoding software, and streaming packaging software to implement a scalable solution so that all viewers can have a unique watermark.

In some embodiments, systems for implementing the video publishing/streaming solutions according to aspects of the present invention include a VM (virtual machine) or scalable platform of VMs (many types out there such as Docker, Kubernetes, AWS, Azure, VMware, and the like) that takes a streaming URL as an input. This URL usually references a "streaming manifest". A streaming manifest is a list of URLs of segmented video "chunks". How video is streamed today is that the video is processed from a single file and "chunked" into smaller pieces, such as two-second segments. The manifest is a playlist that instructs a streaming player the order in which to play these "chunks" or segments. The resulting playback experience is a seamless video.

According to methods of the present invention, software can include program code on a virtual machine (VM) platform that can intercept the manifest (aka the playlist), parse the URLs within the manifest, "GET" the segments referenced in the manifest, cache them, decode them, watermark them, re-encode them into a unified format and then host a new written manifest with watermarked segments to be sent to the player or app of the end user/viewer. This is done for every end-user/viewer. The watermarked info can be sent to the VM via API or via a GUI by the content creator/broadcaster/network, which can include the watermark text or image, the position of the watermark placement, frequency (e.g., every 5 minutes display 10 second text) and any display effects desired (e.g., fade, opacity, size).

If the stream has DRM, the methods can integrate with the original broadcaster or streaming company to sync up with their DRM license servers so that the VM operating the software program code can decrypt and re-encrypt the video "chunks" during the decoding/encoding steps.

If the stream has forensic watermarking via A/B dynamic manifests, aspects of the present invention simply can integrate with the original broadcaster to become a proxy to the player/app to obtain the unique A/B forensic pattern, cache the segments/chunks and watermark before serving it to the client/app.

Some of the benefits provided by the anti-piracy solutions of the present invention include (1) they are able to perform the function at about 1/100th the cost of the conventional products; (2) they are able to have moving watermarks (requested by would-be customer, but conventional server-side products cannot provide); (3) they are able to work on live-streaming, which is not possible by current conventional products; (4) they are able to watermark and retain original video quality, unlike conventional products which have to degrade quality to make it work without long delays; (5) they utilize a simple VM infrastructure that allows solutions of the present invention to work on any cloud platform, such as Google, AWS, Azure, dedicated VM networks, private networks, or even content delivery network (CDN) edge computing, where conventional products are typically utilized only on Amazon Web Services (AWS) and have not migrated anywhere else; (6) they can integrate with any forensic watermarking company; and (7) they can integrate with any DRM provider.

While the above describes the system and methods usable for anti-piracy solutions for streaming video content, the system may be applied to other fields, such as in using the watermarking for advertisements or targeted marketing. For example, dynamic ads can be provided based on known user, demographics, or other variables based on VAST and similar ad-networks and libraries. In some embodiments, dynamic, but with the option of being regional, watermarking can be used, where, instead of individual watermarking, watermarking based on groups may be provided. Further, watermarking may be based on geography, demographics, networks, or the like. For example, during broadcast the system can watermark network syndication based on ISP network connection, for example, while watching live soccer match—Cox Communications may come up for one viewer, but another viewer across town may have Charter Communications. In some embodiments, unique codes could be streamed so that viewers can identify themselves in interactive TV or games (like promotional drawing).

In some embodiments, the systems of the present invention can be used for watermarking digital signage or videos in public spaces, where the watermarking can be dynamic to the location so that images or media that captures it can determine where the impressions were made for ads or displays. If the watermark is a QR code, viewers who capture that QR code can be directed to different landing sites that is unique to that specific video stream.

In some embodiments, in addition to or in lieu of any other visual or forensic watermarking, aspects of the present invention can provide a baseband forensic watermark, where an actual transcoded modification of the images or frames of a single video stream can be provided. This is different from conventional watermarking on the edge, where a pattern is provided to infer a forensic uniqueness; such as "AB forensic watermarking" that creates a single watermarking stream from two watermarked streams.

Further, smart watermarking placement can be implemented within the scope of the present invention, where artificial intelligence (AI) or other algorithms can be used to determine what part of the screen is optimal to place visual watermarking to either: a. Increase impact of visual watermarking (dark text on bright background, or bright text on dark background), b. Reduce impact of visual watermarking (dark text on dark background), c. Determine when to watermark, or d. Determine if text or subtitles on screen to place watermark elsewhere—avoid space—define off-limits area. Such systems can further provide the ability to define off-limit areas for watermarking and/or define where watermarking should be positioned. Such systems can, for example, define random placement based on drawn or pre-determined areas. Pre-defined templates of where watermarks can appear include, for example, corners, the center, random locations, cycling among locations such as the four corners, or the like. Such systems can further define effects of the watermark, such as fading in and out, size of font (if textual), opacity, or the like.

As discussed above, the system and methods according to aspects of the present invention can be used with or without DRM, with or without forensic watermarking (A/B), or with or without full "bitrate ladder" watermarking. A "bitrate ladder" describes the group of video streams of identical content encoded at different quality bitrates and/or resolutions. As the basis for Adaptive Bitrate Streaming, the different quality video streams in the bitrate ladder allows the player to select which quality to reduce or eliminate buffering during playback. The systems and methods used in this invention include scalable parallel processing to watermark all the bitrates simultaneously to also support dynamic visual watermarking on adaptive bitrate streaming.

In summary, the video publishing/streaming solutions, which can include, for example, anti-piracy solutions, according to aspects of the present invention can provide several features that distinguish it from conventional systems and methods. Such features include, as non-limiting examples, (1) Dynamically watermark visual burnt-in video watermarks—session based—unique to each user/viewer/streamer; (2) the ability to work on live streams, not just VOD (video-on-demand); (3) the ability to fade watermarks in and out; (4) the ability for watermarks to move around screen; and (5) the ability to be deployed on any Cloud platform and/or CDNs; (6) the ability to retain the quality of the source video. Further, aspects of the present invention can provide dynamic visual watermarks on a video stream without requiring the use of a database or other similar computing resources.

The anti-piracy solution according to aspects of the present invention can be implemented in various manners, such as a pay-as-go model, where a streaming video provider may be charged per minute, per second, per title or the like. The solution can further provide software to track usage based on account variables, such as but not limited to bandwidth, transferred data, storage and other cloud usage or reservations (provisioned resources). The solution may be licensed and deployed on customer infrastructure or cloud computing accounts and platforms, can be implemented as an API service or may be utilized via a GUI-based video platform SaaS for smaller customers or customers who do not need integration.

Figure 2:
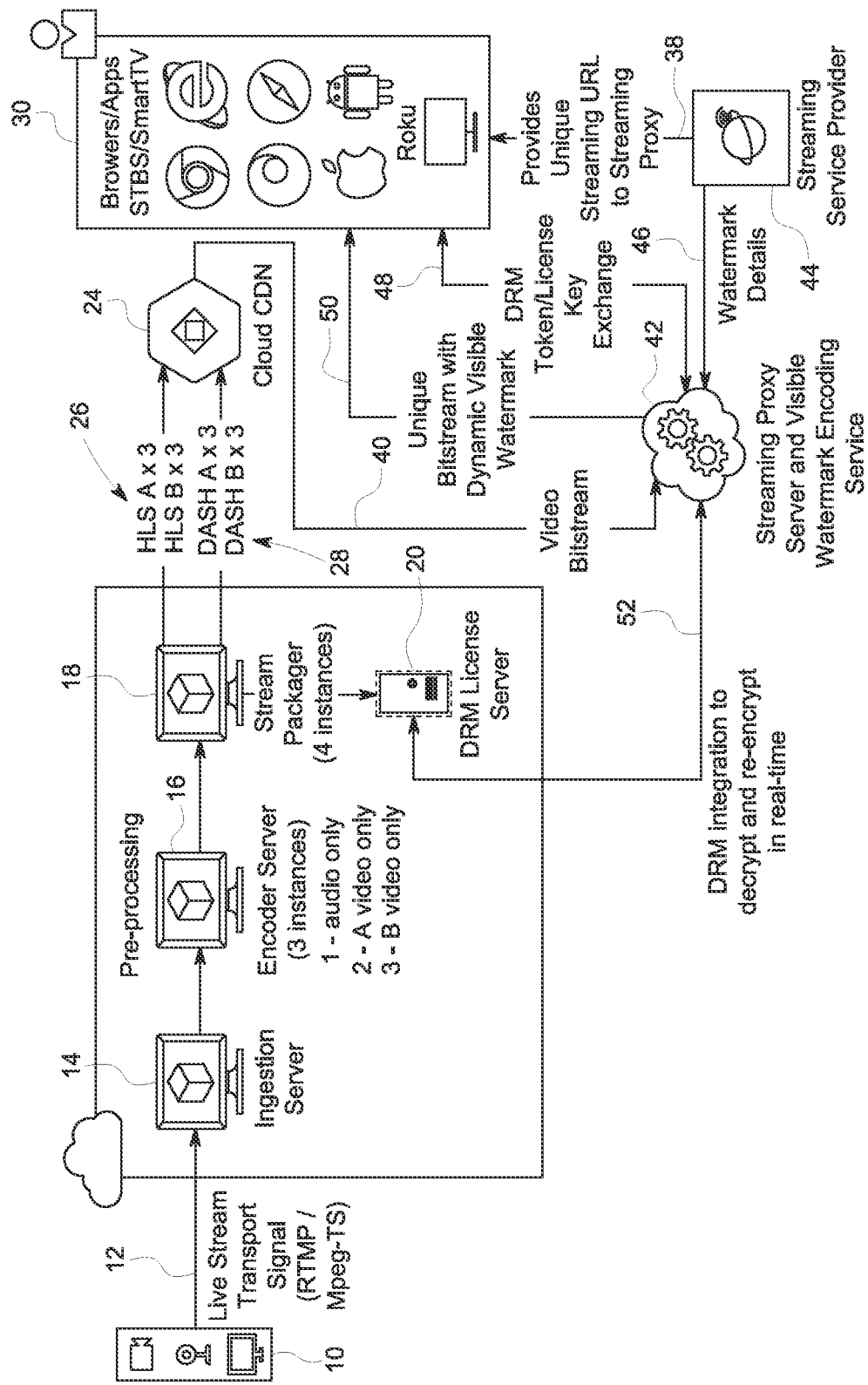
FIG. 2 illustrates a flow chart showing a video publishing/streaming solution, according to an exemplary embodiment of the present invention, used on a live stream with DRM, forensics A/B dynamic manifests and visible watermark.
Figure 3:
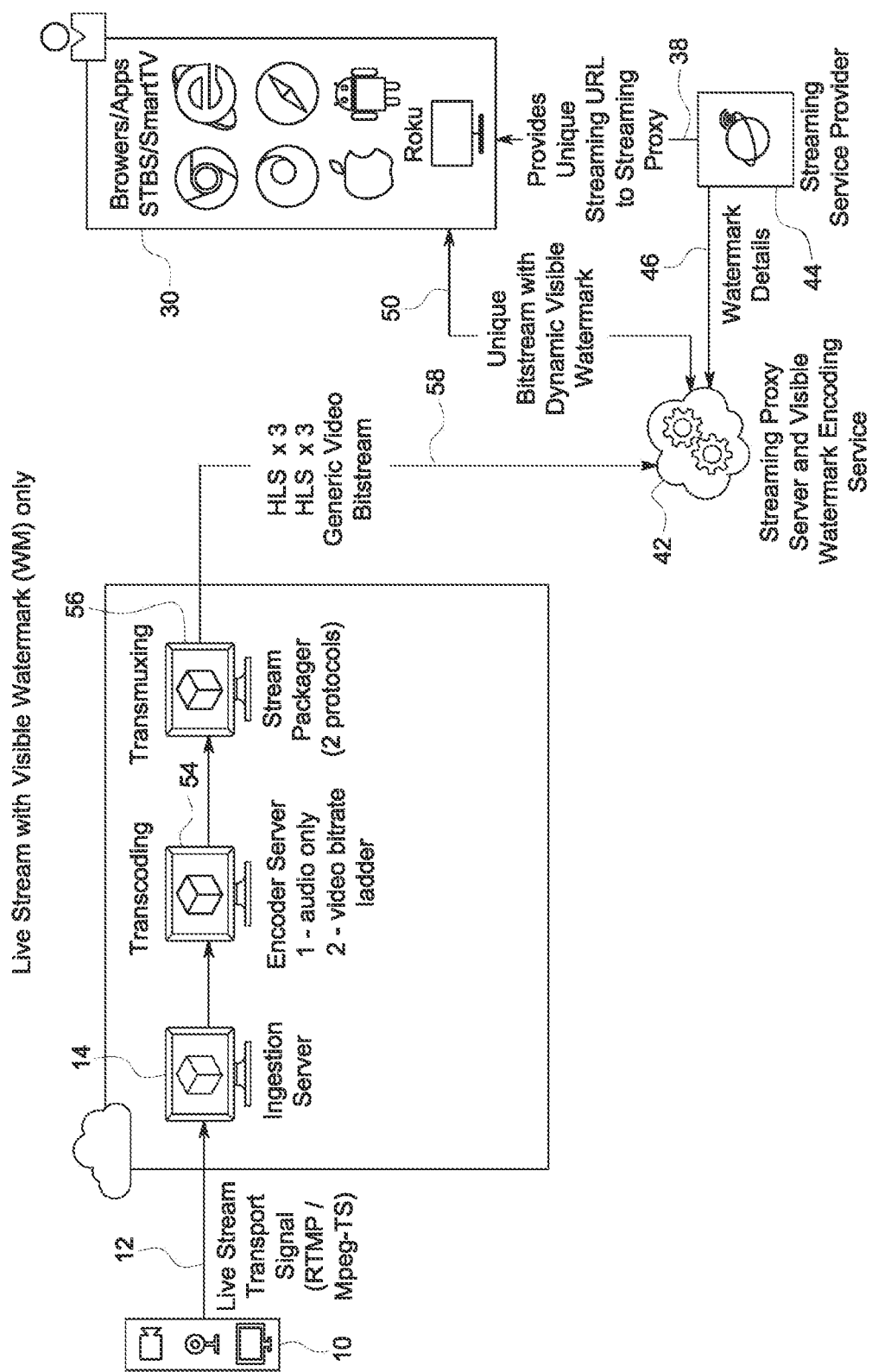
FIG. 3 illustrates a flow chart showing a video publishing/streaming solution, according to an exemplary embodiment of the present invention, used on a live stream with visible watermark only.

Referring now to FIGS. 2 and 3, an implementation of the system and methods according to aspects of the present invention are illustrated for a live stream 10 as the streaming video source. FIG. 1 illustrates how a live stream 10 with DRM and forensics A/B dynamic manifests are conventionally provided to the end viewer. The live stream transport signal 12 may use, for example, real-time messaging protocol (RTMP), Mpeg-transport stream (Mpeg-TS), or other similar signal protocol. An ingestion server 14, within a cloud computing platform 22, may receive this stream and pass the stream to an encoder server 16, where three instances of the encoder may be used, one for audio and one for each of the A video and the B video if forensic A/B watermarking streaming is required. Otherwise, a single video stream is encoded. A stream packager 18 can provide various protocols (such as HTTP live streaming 26 (HLS) and dynamic adaptive streaming over HTTP 28 (DASH)) for transmuxing and repackaging the live stream. Depending on the security already present (DRM, forensics A/B dynamic manifests, visible watermark), the system may deliver the content, including the added dynamic visual watermark, to the user 30 via a streaming proxy server and, optionally, a content delivery network (CDN) 24 or distributed cloud platform.

As shown in FIG. 1, in some embodiments, a DRM license server 20 may exchange a token 32 and license key 34 with the video viewing equipment, such as the browsers/Apps/Set-top boxes (STBs)/Smart TV, of the user 30.

As shown in FIGS. 2 and 3, and as discussed in greater detail below with respect to FIGS. 8 and 9, a streaming proxy server and visible watermark encoding service 42 can receive a video stream 40 from the CDN 24 (FIG. 2) or can receive a generic video bitstream 58 (FIG. 3). Further, the streaming proxy server and visible watermark encoding service 42 can receive watermark details 46 from a streaming service provider 44 and can provide a unique bitstream with the dynamic visible watermark 50 to the user 30. The streaming service provider 42 can further provide a unique streaming URL 38 to a streaming proxy of the user.

As shown in FIG. 2, where the DRM license server 20 is present, the streaming proxy server and visible watermark encoding service 42 can provide DRM integration 52 to decrypt and re-encrypt in real-time. Further, the streaming proxy server and visible watermark encoding service 42 can provide an DRM token/license key exchange 48 with the devices of the user 30.

Figure 4:
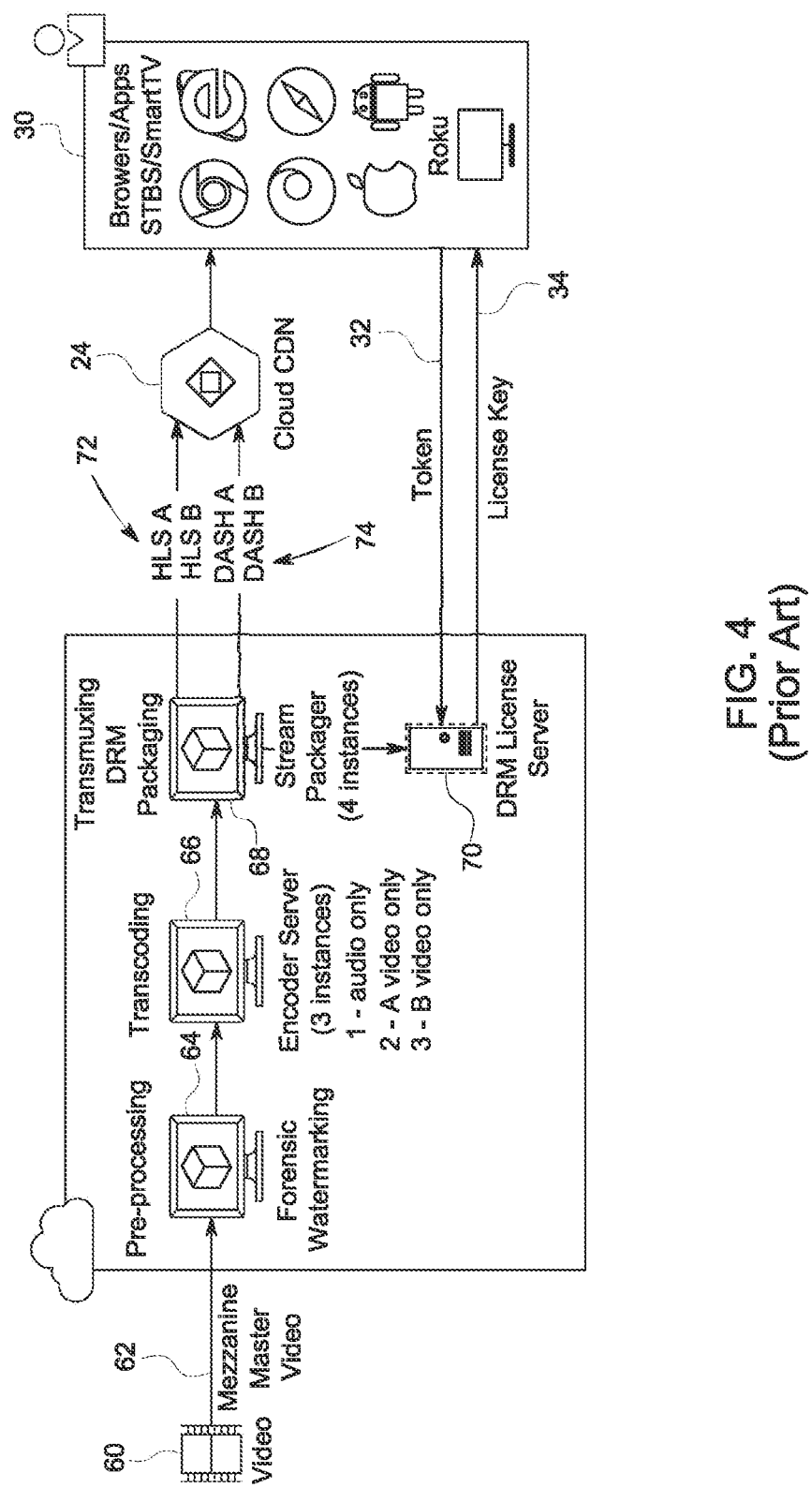
FIG. 4 illustrates a flow chart showing a typical screener level protected workflow according to the prior art, used on video-on-demand streaming with DRM and forensics A/B dynamic manifests.

Referring to FIGS. 4 through 7, an implementation of the system and methods according to aspects of the present invention are illustrated for video-on-demand 60 as the streaming source 62. Similar configurations, as shown and described with reference to FIGS. 2 and 3, as illustrated. FIG. 4 illustrates how a video-on-demand stream with DRM and forensics A/B dynamic manifests are conventionally provided to the end viewer. Of course, other implementations may be included within the scope of the present invention.

Figure 6:
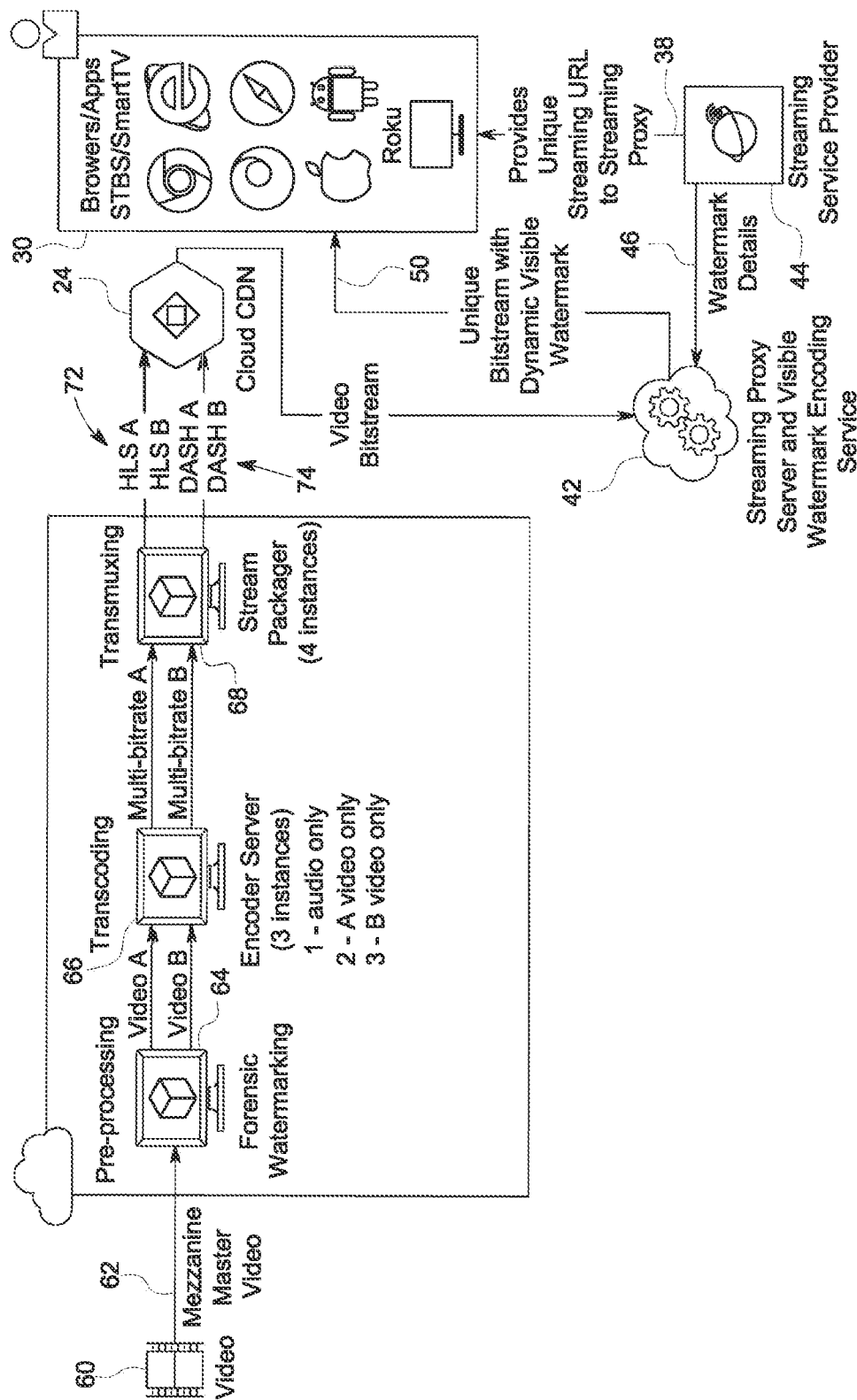
FIG. 6 illustrates a flow chart showing a video publishing/streaming solution, according to an exemplary embodiment of the present invention, used on video-on-demand streaming with forensics A/B dynamic manifests and visible watermark.
Figure 7:
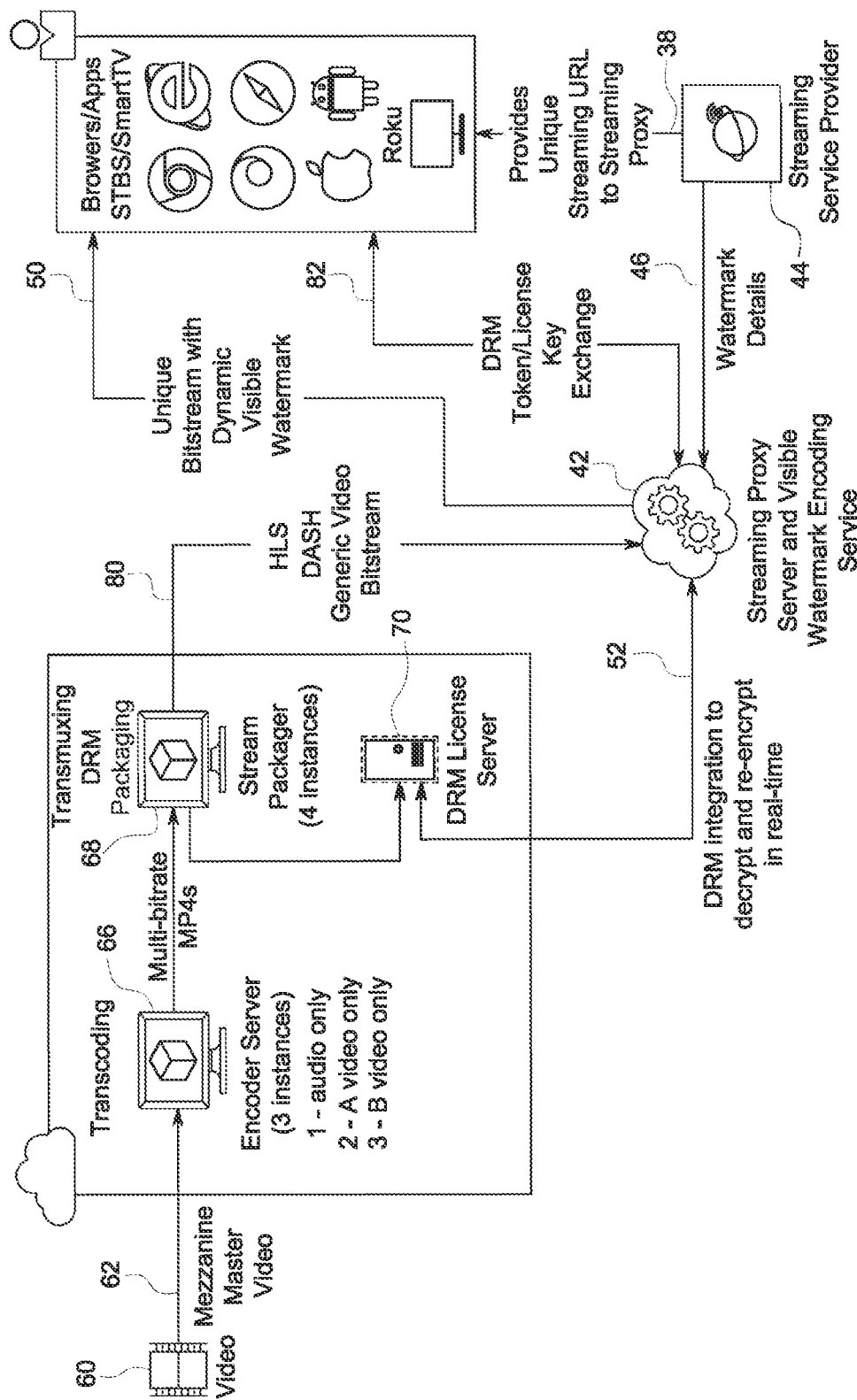
FIG. 7 illustrates a flow chart showing a video publishing/streaming solution, according to an exemplary embodiment of the present invention, used on video-on-demand streaming with DRM and visible watermark.

Forensic watermarking 64 may be performed (FIGS. 4 through 6) or may be absent (FIG. 7). An encoder server 66 may receive the stream, where three instances of the encoder may be used, one for audio and one for each of the A video and the B video if forensic A/B watermarking streaming is required. Otherwise, a single video stream is encoded. A stream packager 68 can provide various protocols (such as HTTP live streaming 72 (HLS) and dynamic adaptive streaming over HTTP 74 (DASH)) for transmuxing and repackaging the live stream. Where a DRM license server 70 is present, the stream packager 68 may be a transmuxing DRM packaging stream packager. Depending on the security already present (DRM, forensics A/B dynamic manifests, visible watermark), the system may deliver the content, including the added dynamic visual watermark, to the user 30 via a streaming proxy server and, optionally, a content delivery network (CDN) 24 or distributed cloud platform.

As shown in FIG. 4, in some embodiments, a DRM license server 20 may exchange a token 32 and license key 34 with the browsers/Apps/Set-top boxes (STBs)/Smart TV of the user 30.

Figure 5:
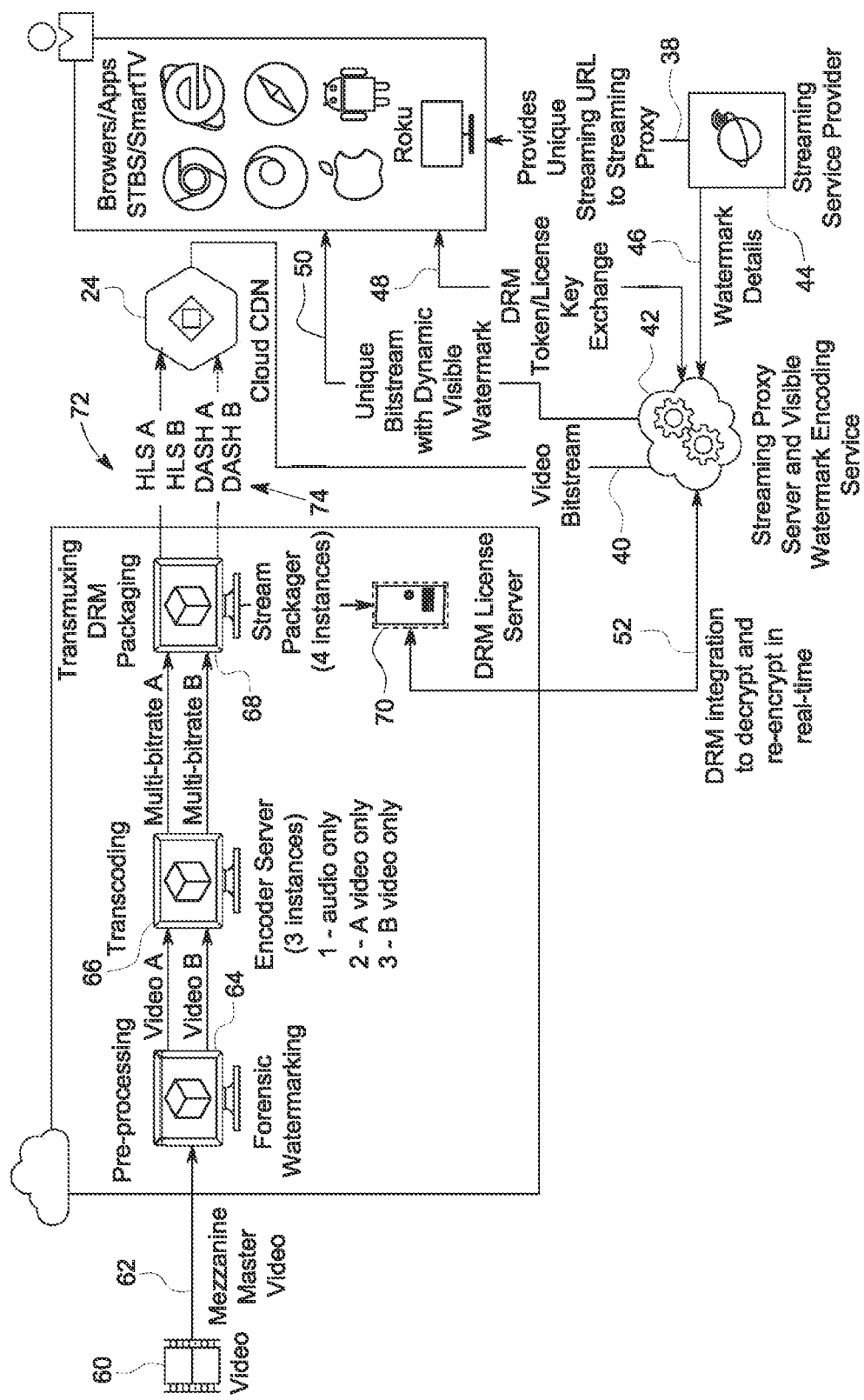
FIG. 5 illustrates a flow chart showing a video publishing/streaming solution, according to an exemplary embodiment of the present invention, used on video-on-demand streaming with DRM, forensics A/B dynamic manifests and visible watermark.

As shown in FIGS. 5 through 7, and as discussed in greater detail below with respect to FIGS. 8 and 9, a streaming proxy server and visible watermark encoding service 42 can receive a video stream 40 from the CDN 24 (FIGS. 5 and 6) or can receive a generic video bitstream 80 (FIG. 7). Further, the streaming proxy server and visible watermark encoding service 42 can receive watermark details 46 from a streaming service provider 44 and can provide a unique bitstream with the dynamic visible watermark 50 to the user 30. The streaming service provider 42 can further provide a unique streaming URL 38 to a streaming proxy of the user.

As shown in FIGS. 5 and 7, where the DRM license server 20 is present, the streaming proxy server and visible watermark encoding service 42 can provide DRM integration 52 to decrypt and re-encrypt in real-time. Further, the streaming proxy server and visible watermark encoding service 42 can provide an DRM token/license key exchange 48 with the devices of the user 30.

Figure 8:
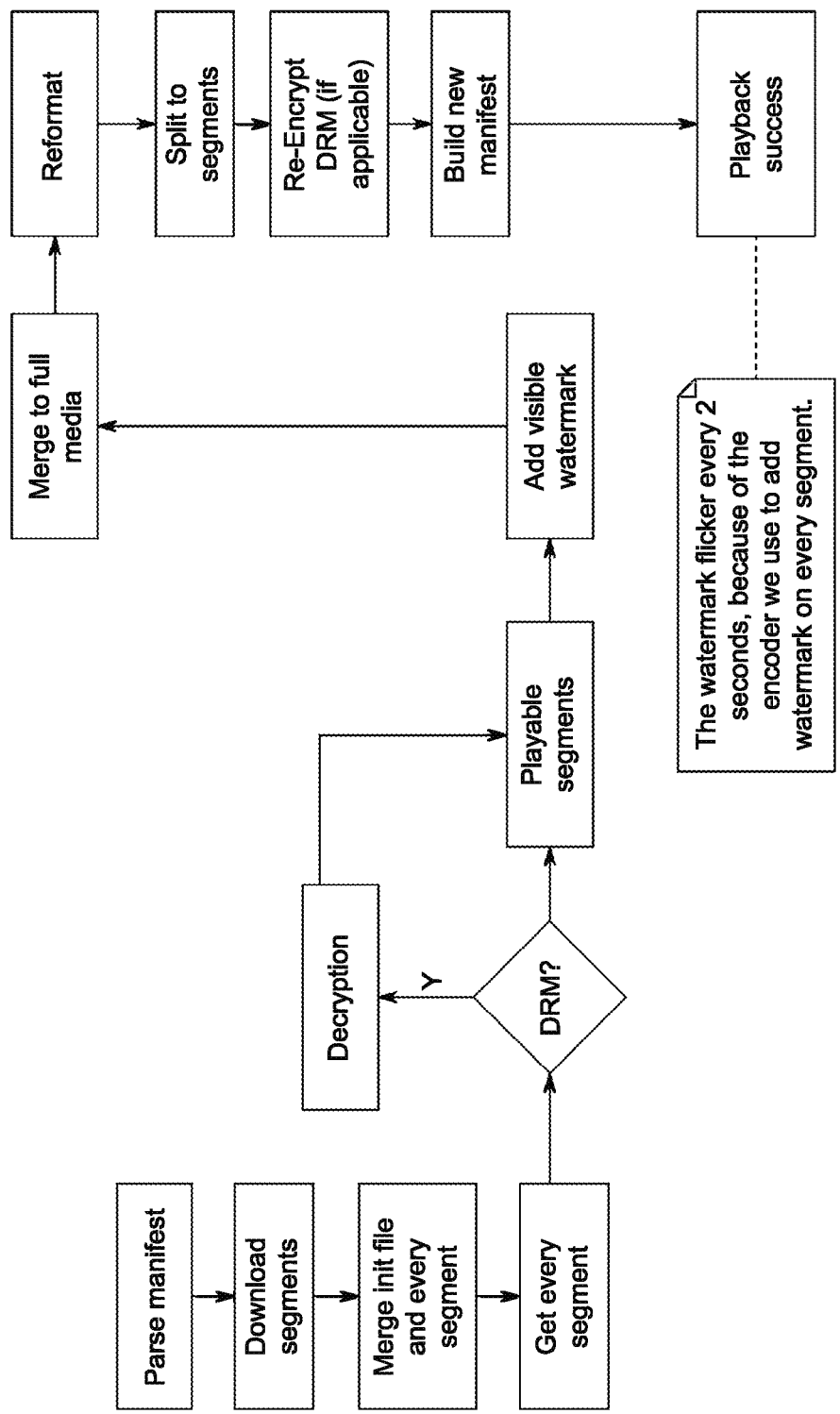
FIG. 8 illustrates a flow chart showing details of an exemplary process for adding a visual watermark to a video stream according to an exemplary embodiment of the present invention.
Figure 9:
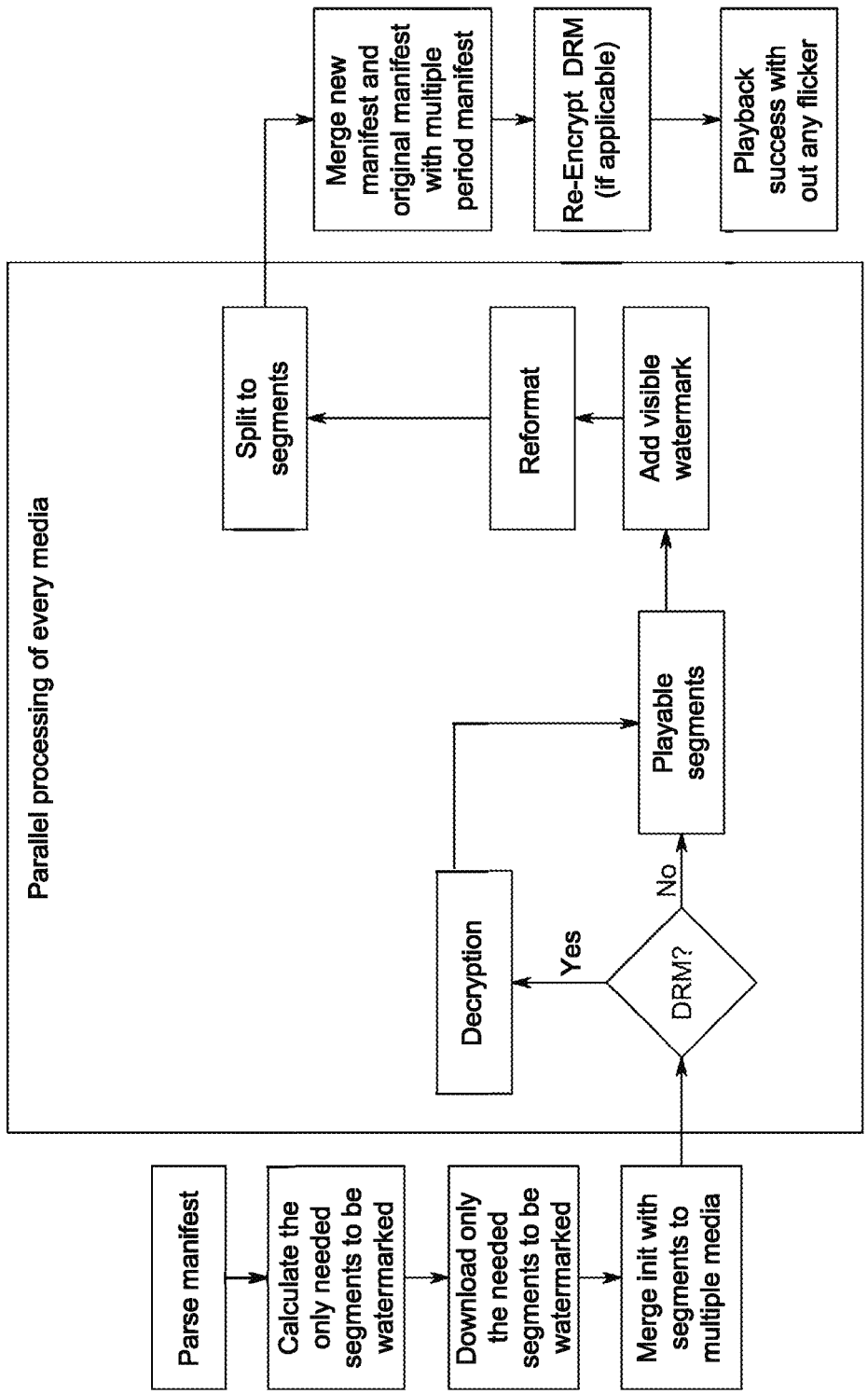
FIG. 9 illustrates a flow chart showing details of another exemplary process for adding a visual watermark to a video stream, according to an exemplary embodiment of the present invention.

FIGS. 8 and 9 illustrate specific implementations of an exemplary embodiment of the present invention, showing how the streaming proxy server and visible watermark encoding service, according to embodiments of the present invention, may perform the task of providing a dynamic visual watermark in a video stream, be it a live stream or a video-on-demand stream. It should be understood that the specific steps shown in FIGS. 8 and 9 are merely exemplary embodiments, and other implementations may be possible to achieve the dynamic visual watermarks according to aspects of the present invention.

The solutions described in FIG. 8 is straight forward process to accomplish dynamic visual watermarking. FIG. 9 shows a slightly more complex model that optimizes the processing to reduce latency and delay in processing the video streams. Additionally, the solution of FIG. 9 has an extra step to determine which segments needs to be cached and manipulated according to the aspects of what watermarking effects are needed. For example, the straight forward approach of watermarking individual segments separately will have a slight "flicker" in the watermark itself. This is mainly because there are often many frames within a single second of video and when video segments are manipulated, there could be visual effects at the border or edge of each segment. To reduce this effect, and to allow for more smooth display of certain effects like fading opacity, aspects of the present invention can combine multiple segments together first before watermarking, and then intelligently splits the segments according to calculated timing. This produces a smooth burn-in display. To further reduce the computational overhead and processing time, the same calculation step determines which segments are not watermarked and therefore does not process it.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A system for providing a dynamic visual watermark to streaming media, comprising:
    a streaming proxy server and visual watermark encoding service receiving a streaming media bitstream from a stream packager and also receiving watermark details from a content provider, wherein
    the streaming proxy server and the visual watermark encoding service provides a unique bitstream with the dynamic visual watermark to a user;
    the dynamic watermark is applied server-side to the streaming media, prior to being delivered to video viewing equipment of the user;
    the dynamic watermark is applied to each video segment after the streaming media had been transmuxed and packaged previously by a stream packager into a plurality of streamable video chunks and a corresponding manifest; and
    the streaming media is from a live stream source or a pre-recorded video stream source.

2. The system of claim 1, wherein the dynamic watermark is a forensic watermark.

3. The system of claim 2, wherein the forensic watermark is selected from one or more of a baseband forensic watermark and a compressed domain forensic watermark.

4. The system of claim 1, wherein, when a digital rights management (DRM) license server is present, the streaming proxy server and visual watermark encoding service decrypts video segments into playable segments, adds the dynamic visual watermark, and re-encrypts the video segments according to requirements provided by the DRM license server.

5. The system of claim 4, wherein the streaming proxy server and visual watermark encoding service exchanges a token/license key with the video viewing equipment of the user.

6. The system of claim 1, wherein the video stream is received from a content delivery network.

7. The system of claim 1, wherein the streaming proxy server and visual watermark encoding service adds the dynamic visual watermark to only a portion of the video stream to reduce flicker in a dynamic visual watermark-applied video stream provided to the user.

8. The system of claim 7, wherein the streaming proxy server and visual watermark encoding service combines multiple segments together first before applying the dynamic visual watermark, and then splits the combined multiple segments according to a predetermined timing.

9. A method for providing dynamic processing to streaming data, comprising:
    receiving the streaming data from a content provider, wherein the streaming data is already transmuxed and includes a segmented video stream and a manifest;
    receiving dynamic watermark data from the content provider;
    preparing a modified video stream of the streaming data with the dynamic watermark data applied thereto; and
    delivering the modified video stream to a user, wherein;
    the dynamic watermark is applied to each video segment of the segmented video stream after the streaming media bitstream had been transmuxed previously;
    the dynamic processing includes at least one of a forensic watermark, a dynamic visual watermark or meta data; and
    the streaming data is a stream media bitstream from a live video source or from a pre-recorded video source.

10. The method of claim 9, further comprising, when a digital rights management (DRM) license server is present during pre-processing of the streaming media, decrypting video segments into playable segments, adding the dynamic visual watermark, and re-encrypting the video segments according to requirements provided by the DRM license server.

11. The method of claim 10, further comprising exchanging a token/license key with the video viewing equipment of the user.

12. The method of claim 9, further comprising receiving the streaming media from a content delivery network.

13. The method of claim 9, further comprising adding the dynamic visual watermark to only a portion of the video stream to reduce flicker in a dynamic visual watermark-applied video bitstream provided to the user.

14. The method of claim 13, further comprising combining multiple segments together first before applying the dynamic visual watermark, and then splitting the combined multiple segments according to a predetermined timing.

15. A method for providing a dynamic watermark to a streaming media stream generated by a stream packager after having been transmuxed and repackaged as video segments and a manifest, the method comprising:
    intercepting the manifest of the streaming media stream;
    parsing streaming URLs within the manifest;
    downloading video segments referenced by the streaming URLs to a streaming proxy server and visible watermark encoding service;
    adding the dynamic watermark to the video segments;
    reformatting the dynamic watermark applied video segments;
    building a new manifest for playback of a unique video stream with the dynamic watermark applied; and
    delivering the unique video stream to video viewing equipment of a user.

16. The method of claim 15, further comprising:
    decrypting the streaming media stream into playable segments that are downloaded to the streaming proxy server and visible watermark encoding service; and
    re-encrypting the unique video stream prior to delivering the unique video stream to the video viewing equipment of the user.

17. The method of claim 15, further comprising:
    determining a selected portion of the video segments to download;
    adding the dynamic watermark to only the selected portion of the video segments;
    reformatting the dynamic watermark applied selected portion of video segments;
    splitting the reformatted video segments and preparing a new manifest based on the splitting of the reformatted video segments; and merging the new manifest with the manifest with a multiple period manifest to provide playback without flicker due to the dynamic watermark.

\* \* \* \* \*